(12) United States Patent
Koeppel et al.

(10) Patent No.: US 10,262,359 B2
(45) Date of Patent: Apr. 16, 2019

(54) FINANCIAL STATUS DISPLAY

(71) Applicant: Capital One Services, LLC., McLean, VA (US)

(72) Inventors: Adam R. Koeppel, Washington, DC (US); Alex L. Niderberg, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 686 days.

(21) Appl. No.: 14/920,814

(22) Filed: Oct. 22, 2015

(65) Prior Publication Data

US 2016/0117765 A1   Apr. 28, 2016

Related U.S. Application Data

(60) Provisional application No. 62/067,525, filed on Oct. 23, 2014.

(51) Int. Cl.
*G06Q 40/00* (2012.01)
*G06T 11/00* (2006.01)

(52) U.S. Cl.
CPC ............ *G06Q 40/00* (2013.01); *G06T 11/001* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 6,088,431 A | 7/2000 | LaDue | |
| 6,430,406 B1 | 8/2002 | Frisk et al. | |
| 7,249,087 B2 * | 7/2007 | Sharp | G06Q 10/08 705/37 |
| 7,788,126 B2 * | 8/2010 | Wagner | G06Q 10/06311 705/300 |
| 8,442,872 B2 * | 5/2013 | Turner | G06Q 20/02 705/26.4 |
| 8,779,345 B2 | 7/2014 | Mahowald | |
| 2002/0111892 A1 | 8/2002 | Sharp et al. | |

(Continued)

OTHER PUBLICATIONS

International Search Report dated Jan. 11, 2016 for International Application No. PCT/US15/56995 (12 pages).

(Continued)

*Primary Examiner* — Frantzy Poinvil
(74) *Attorney, Agent, or Firm* — Finnegan, Henderson, Farabow, Garrett & Dunner, LLP

(57) ABSTRACT

Systems and methods are provided for displaying account information. The systems and methods may include a status display device connected to a network in a home or office environment. The status display may be configured to provide a constant status indicator, to provide a user with a quick and simple account status, without the need for multi-step login and verification processes. The status display may receive account status information from a server, the account status information excluding sensitive information identifying the user or the account. The status display may provide colored indicators to inform the user of their financial situation while reducing security risks and reducing processing capability requirements, thereby allowing for a simple status display device that can be placed throughout a household or integrated into common household items.

13 Claims, 7 Drawing Sheets

(56) References Cited

U.S. PATENT DOCUMENTS

| | | | |
|---|---|---|---|
| 2004/0097220 A1* | 5/2004 | McGregor | H04M 15/00 455/419 |
| 2004/0127198 A1 | 7/2004 | Roskind et al. | |
| 2005/0218211 A1 | 10/2005 | Saso et al. | |
| 2009/0299934 A1 | 12/2009 | Horvitz et al. | |
| 2010/0250420 A1* | 9/2010 | Ariff | G06Q 40/00 705/35 |
| 2010/0250430 A1* | 9/2010 | Ariff | G06Q 40/00 705/38 |
| 2010/0306533 A1 | 12/2010 | Phatak | |
| 2012/0056091 A1 | 3/2012 | Mahowald et al. | |
| 2013/0238455 A1 | 9/2013 | Laracey | |
| 2014/0214670 A1* | 7/2014 | McKenna | G06Q 20/40145 705/44 |
| 2015/0052033 A1 | 2/2015 | Boyanov et al. | |
| 2015/0193866 A1* | 7/2015 | Van Heerden | G06Q 40/02 705/35 |
| 2015/0193869 A1* | 7/2015 | Del Vecchio | G06Q 40/02 705/42 |
| 2015/0280436 A1 | 10/2015 | Weckx et al. | |
| 2015/0332226 A1* | 11/2015 | Wu | G06Q 20/10 705/39 |

OTHER PUBLICATIONS

Supplementary European Search Report dated Feb. 9, 2018, issued in corresponding European Patent Application No. 15853127.7 (7 pages).
Office Action dated Aug. 7, 2018 issued in corresponding U.S. Appl. No. 15/847,145 (13 pages).
Written Opinion of the international Searching Authority dated Jan. 11, 2016 for PCT/US2015/056995 (5 pages).

* cited by examiner

FINANCIAL STATUS DISPLAY

CROSS REFERENCE TO RELATED APPLICATIONS

This application is entitled to and claims the benefit of priority from U.S. Provisional Application No. 62/067,525 filed Oct. 23, 2014, the contents of which are expressly incorporated herein by reference.

BACKGROUND

In today's society, individuals often worry about their financial health, but often lose touch with their current financial health status. Individuals also lose sight of upcoming events such as payment due dates. In order to stay informed, many individuals rely on their financial service providers' notification systems.

Some financial service providers allow customers to set up notifications and reminders for payment due dates, fraudulent account activity, spending goals/limits, account overdrafts, and other events warranting special attention. Typical notification systems provide the notifications and reminders in the form of text messages, emails, and social media notifications. Similar to junk mail and advertisements, many of these notifications or reminders go unnoticed or soon become a nuisance to the customer and, thus, get ignored. On the other hand, a lack of any notification or reminder leaves individuals in the dark about their financial situation, and places the burden on the individuals to proactively monitor their account statuses. Manual account monitoring usually requires the individual to navigate to a website or mobile application (app) and enter authentication credentials just to ascertain whether their account status is normal or abnormal.

Thus, a notification system is desired that provides constant, yet passive, account status indications in order to effectively and efficiently inform individuals of their financial situations.

SUMMARY

Disclosed embodiments provide methods and systems for using a status display to provide account statuses.

Consistent with a disclosed embodiment, a display device for providing an account status is provided. The device may include a processor, a display, a transceiver, and a memory having stored thereon instructions executable by the processor. When executed, the instructions may configure the processor to establish a connection with a communication network via the transceiver to access account status information for a first account associated with a user, receive the account status information via the connection, determine an indication based on the received account status information, and output, via the display, the determined indication.

Consistent with another disclosed embodiment, a system for providing an account status is provided. The system may include a transceiver, a memory, and a processor. The processor may be coupled to the transceiver and configured to execute instructions stored in the memory to receive information for a first account associated with a user, analyze the received information to identify one or more status indicators, determine a status for the first account based on the one or more status indicators, generate account status information based on the determined status, the account status information excluding sensitive information that identifies the user or the first account, and transmit, by the transceiver, the account status information to a display device.

Consistent with another disclosed embodiment, a computer-implemented method of providing an account status is provided. The method may comprise accessing information from a database for a first account associated with a user, analyzing, by a processor, the received information to identify one or more status indictors, determining a status for the first account based on the one or more status indicators, generating, by the processor, account status information based on the determined status, the account status information excluding sensitive information that identifies the user or the first account, and transmitting, by a transceiver, the account status information to a display device.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
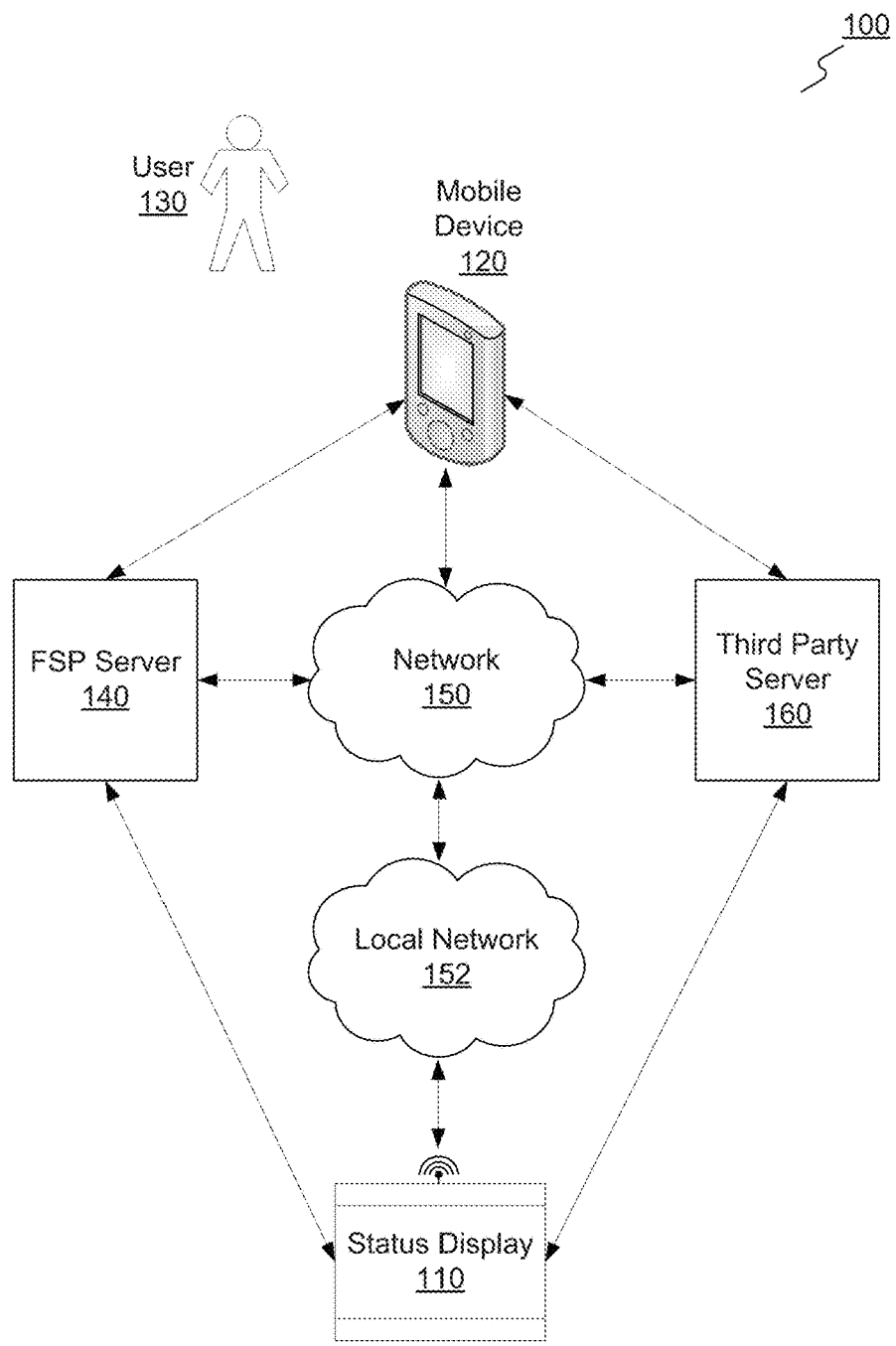
FIG. 1 is a diagram of an exemplary system that may be used to generate and display account status information using a status display, consistent with disclosed embodiments.

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are generally directed to systems, devices, and methods for providing account status information using a status display. The status display may include a continuous, easy-to-read indication of financial health. For example, the status display may display a color like green, yellow, or red, corresponding to one of a plurality of simple statuses like "normal," "notification/warning", and "urgent/alert," respectively. In some embodiments, the status display may display a simple icon representative of account status such as a check-mark for a normal status or an exclamation point for an alert status. In some embodiments, the status display may display an avatar which changes appearance depending on the account status, such as a happy character for a normal status, a curious character for a warning status, and an upset character for an alert status. The status display may provide a constant reassurance to customers that their finances are in order, and provide multiple levels of simple notifications when their attention is required. By displaying the indication continuously and passively in a household environment, the individual may glance at the status device any time and instantly gain a basic understanding of their current financial situation.

According to some embodiments, the status display may receive account status information from a server operated by a service provider such as a financial service provider ("FSP"). The FSP may be a bank, credit card company, or other entity associated with financial transactions. The server may store the account information for one or more accounts associated with an individual, and analyze the account information to generate account status information. In some embodiments, the account status information may exclude sensitive data identifying the account or the individual, and merely provide instructions for the status display to display a certain color, icon, status message, or reminder. The absence of sensitive data in the account status information may improve server and status display performance by reducing the amount of data transferred over network and by eliminating the need for strong encryption and decryption methods, thereby reducing power and processing capability requirements for the status device, reducing communication network bandwidth, and reducing security risks.

In some embodiments, an application ("app") may compliment the status display. The individual may access the app via a computer or mobile device to receive more detailed information regarding their financial health after observing the simple status indication on the status display. For example, when the status display indicates an alert or warning status, such as a red or yellow light, respectively, the individual may launch the app and login to their account in order to receive more detailed account information or messages associated with the red or yellow light. Using the app as a secondary tool for observing account status, the present embodiments may improve system functionality by transmitting sensitive personal information only when needed to the app, rather than constantly encrypting and transmitting sensitive data to the status display, and decrypting and analyzing the sensitive data on the status display. While reducing the amount of necessary power and processing capabilities, the disclosed embodiments also provide an enhanced user experience through simple continuous reminders of financial health.

In some embodiments, the status display may be a small, button magnet-sized device having a display such as LED lights or a digital display screen. The status display may communicatively link to a communication network such as WiFi or a cellular network, to communicate with a FSP server. The status display may receive account status information updates initiated by the FSP server as "push" updates at a predetermined time interval and/or when a change in account status is detected, and display an indication corresponding to the account status information. The status display may provide the indication continuously and passively in environment such as a household or office.

In some embodiments, the individual may access an app installed on a mobile device, or access a web app via a computer web browser, to authenticate the individual and retrieve detailed account information and messages related to the indication displayed on the status display. The app may be a standalone software application for a personal computing device, such as personal computer software or a mobile device app, or part of another software application provided by the FSP for managing finances related to banking, checking credit cards, debit cards, and/or loans.

FIG. 1 shows a diagram of an exemplary account status display system 100 that may be configured to perform one or more software processes that, when executed by one or more processors, retrieve and display account statuses, consistent with disclosed embodiments. The components and arrangements shown in FIG. 1 are not intended to limit the disclosed embodiments, as the components used to implement the disclosed processes and features may vary.

In accordance with disclosed embodiments, account information display system 100 may include a status display 110, one or more mobile device 120, a financial service provider ("FSP") server 140, and one or more third party servers 160. Mobile device 120, FSP server 140, and third party server 160 may communicate through network 150, and status display 110 may communicate through local network 152, such as a home WiFi network.

Status display 110 may be a small standalone device placed in user 130's home, office, or other preferred location. In some embodiments, status display 110 may be a refrigerator magnet with one or more colored lights or a graphic display. In some embodiments, status display 110 may be a module integrated within a household item such as a mirror, clock, doorknob, light fixture, thermostat, television, or any other item placed in a central location in a house or office, to inform user 130 of their account status.

User 130 may be a customer of the financial service provider, such as an individual who holds a credit card, debit card, checking, and/or savings account with a financial service provider bank. User 130 may operate status display 110 and/or mobile device 120 or another computer (not shown) to set up status display 110.

Mobile device 120 may be a personal computing device such as, for example, a general purpose or notebook computer, a mobile device with computing ability, a tablet, smartphone, wearable device such as Google Glass™ or smart watches, or any combination of these computers and/or affiliated components. In one embodiment, mobile device 120 may be a computer system or mobile computer device that is operated by customer 130 who is a customer of the FSP.

Mobile device 120 may be connected to FSP server 140 and/or third party server 160 directly or via network 150. Other components known to one of ordinary skill in the art may be included in system 100 to gather, process, transmit, receive, and provide account information consistent with the disclosed embodiments.

FSP server 140 may be operated by a FSP such as a bank, credit card company, merchant, lender, and the like, offering financial services to customers. FSP server 140 may be a computer-based system including computer system components, desktop computers, workstations, tablets, hand held computing devices, memory devices, and/or internal network(s) connecting the components.

Network 150 may comprise any type of computer networking arrangement used to exchange data. For example, network 150 may be the Internet, a private data network, virtual private network using a public network, and/or other suitable connection(s) that enables system 100 to send and receive information between the components of system 100. Network 150 may also include a public switched telephone network ("PSTN") and/or a wireless network.

Local network 152 may comprise any type of computer networking arrangement used to exchange data in a localized area, such as WiFi, Bluetooth™ Ethernet, and other suitable short-range connections that enable status display 110 to send and receive information between the components of system 100. In some embodiments, local network 152 may be excluded, and status display 110 may communicate with system 100 components via network 150. In some embodiments, status display 110 may communicate with one or more system 100 components via a direct wired or wireless connection.

Third party server 160 may be operated by an entity where user 130 holds a non-FSP account, such as a financial institution other than the FSP operating FSP server 140. In some embodiments, third party server may be operated by a credit reporting agency. Status device 110, mobile device 120 and/or FSP server 140 may receive information about user 130's financial situation from third party server 160 such as, for example, information about another account belonging to user 130, a credit report, a credit score, or other financial information associated with user 130. Third party server 160 may include a computer system for handling tasks and data processing related to the operation of the third party (not shown in figure).

Figure 2:
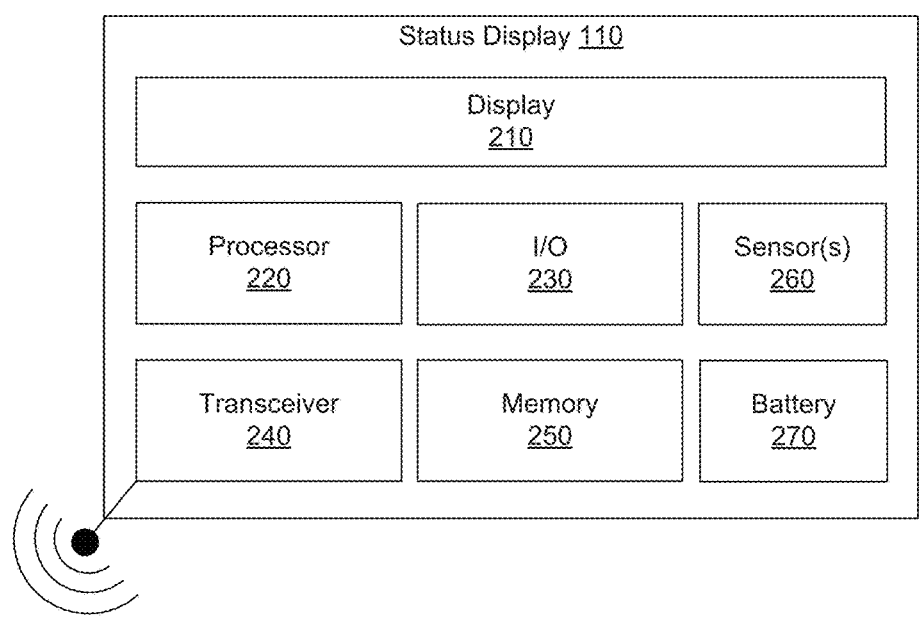
FIG. 2 is a diagram of an exemplary status display, consistent with disclosed embodiments.

FIG. 2 shows a diagram of status display 110, consistent with disclosed embodiments. As shown, status display 110 may include a display 210, one or more processors 220, input/output ("I/O") devices 230, a transceiver 240, memory 250, one or more sensors 260, and a battery 270 with charging circuitry (not shown in figure).

Display 210 may include one or more devices for displaying account information such as, for example, one or more indicator lights, progress bars, numeric light emitting diodes (LEDs), and/or one or more screens such as a liquid crystal display (LCD). In some embodiments, display 210 may comprise a simple multicolored indicator light or set of lights, indicating an account status using one of a plurality of colors and/or an illumination pattern. In other embodiments, display 210 may comprise a strip of indicator lights forming a progress/status bar to display progress toward a spending goal or debt limit. The indicator light strip may contain lights of various colors, or the entire strip may change colors, indicative of an account status or a threshold being crossed. In some embodiments, display 210 may comprise an LCD (or other type of pixelated screen) to display a graphic or a short message including one or more lines of text, numbers, and symbols to provide account status.

Processor 220 may be one or more known processing devices, such as a microprocessor from the Pentium™ family manufactured by Intel™ or the Turion™ family manufactured by AMD™. Processor 220 may constitute a single core or multiple core processors that executes parallel processes simultaneously. For example, processor 220 may be a single core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc. multiple software processes, applications, programs, etc. In another embodiment, processor 220 may include a multiple-core processor arrangement (e.g., dual, quad core, etc.) configured to provide parallel processing functionalities to allow status display 110 to execute multiple processes simultaneously. One of ordinary skill in the art would understand that other types of processor arrangements could be implemented that provide for the capabilities disclosed herein.

I/O devices 230 may include one or more devices that allow status display 110 to receive input from user 130. I/O devices 230 may include, for example, one or more buttons, switches, or a touchscreen panel. I/O devices 230 may be manipulated by user 130 to activate/deactivate status display 110, or to "silence" the account status indication, such as by turning off display 210 for a predetermined amount of time after manipulating I/O devices 230.

Transceiver 240 may include one or more communication modules for establishing bidirectional wireless communication between status display 110 and local network 152. For example, transceiver 240 may include circuitry and one or more antennas for communicating wirelessly with local network 152 using a short range/near-field wireless communication protocol such as Bluetooth™, Bluetooth™ LE, WiFi, Zigbee, and Z-Wave. Transceiver 240 may be configured to receive account information and settings, and to transmit data requests or requests to join a communication network during setup. In some embodiments, transceiver 240 may establish communication with mobile device 120, FSP server 140, and/or third party server 160, either via a direct communication link, or via network 150, to receive account status information directly without the need for network 150. In such embodiments, transceiver 240 may communicate using long range communication capabilities such as a cellular antenna.

Memory 250 may be a volatile or non-volatile, magnetic, semiconductor, tape, optical, removable, non-removable, or other type of storage device or tangible (i.e., non-transitory) computer-readable medium that stores account information, settings, and one or more programs for performing functions consistent with the methods disclosed herein. For example, memory 250 may store one or more programs that, when executed, perform functions such as monitoring sensor data from sensors 260, sending network setup requests, receiving account status information updates (e.g., push updates), processing account status information, storing account status information, determining one or more indications associated with the account status information, and/or displaying the determined indication(s).

In some embodiments, status display 110 may contain one or more sensors 260 for collecting environmental, movement, and/or security data. Sensors 260 may include, for example, ambient light sensors, motion detectors, and microphones. Processor 220 may use data collected by sensors 260 to control or modify status display 110 functions. For example, in some embodiments, biometric data such as fingerprint scans may be used to authenticate user 130 and activate status display 110. In some embodiments, ambient light, movement, and/or sound data may be monitored to activate and/or deactivate status display 110. For example, processor 220 may activate status display 110 when the presence of a person is detected proximate to status display 110, based on received movement and/or sound data. Processor 220 may place status display 110 into a "sleep" or standby mode when movement and/or sound is undetected for a predetermined period of time.

In some embodiments, processor 220 may automatically adjust the intensity of light emitted from display 210 based on ambient light data sent from sensors 260. For example, if sensor 260 collects ambient light data indicating a dim or dark room, processor 220 may reduce the brightness of display 210 to conserve battery 270 power and to provide a softer indication. In contrast, processor 220 may increase the brightness of display 210 when sensor 260 detects a high amount of ambient light, to ensure that user 130 is able to easily see the color and illumination pattern being displayed.

By using sensors 260 to automate certain functions, status display 110 may provide a more enjoyable and user-friendly experience.

Battery 270 may include a disposable or rechargeable battery suitable for powering the components of status display 110 for an extended period of time, to reduce the need to replace or recharge batteries often during substantially continuous operation. In some embodiments, battery 270 may be replaced with a hard-wired power source, such as a power cord, to remove the need to replace or recharge batteries.

Figure 3:
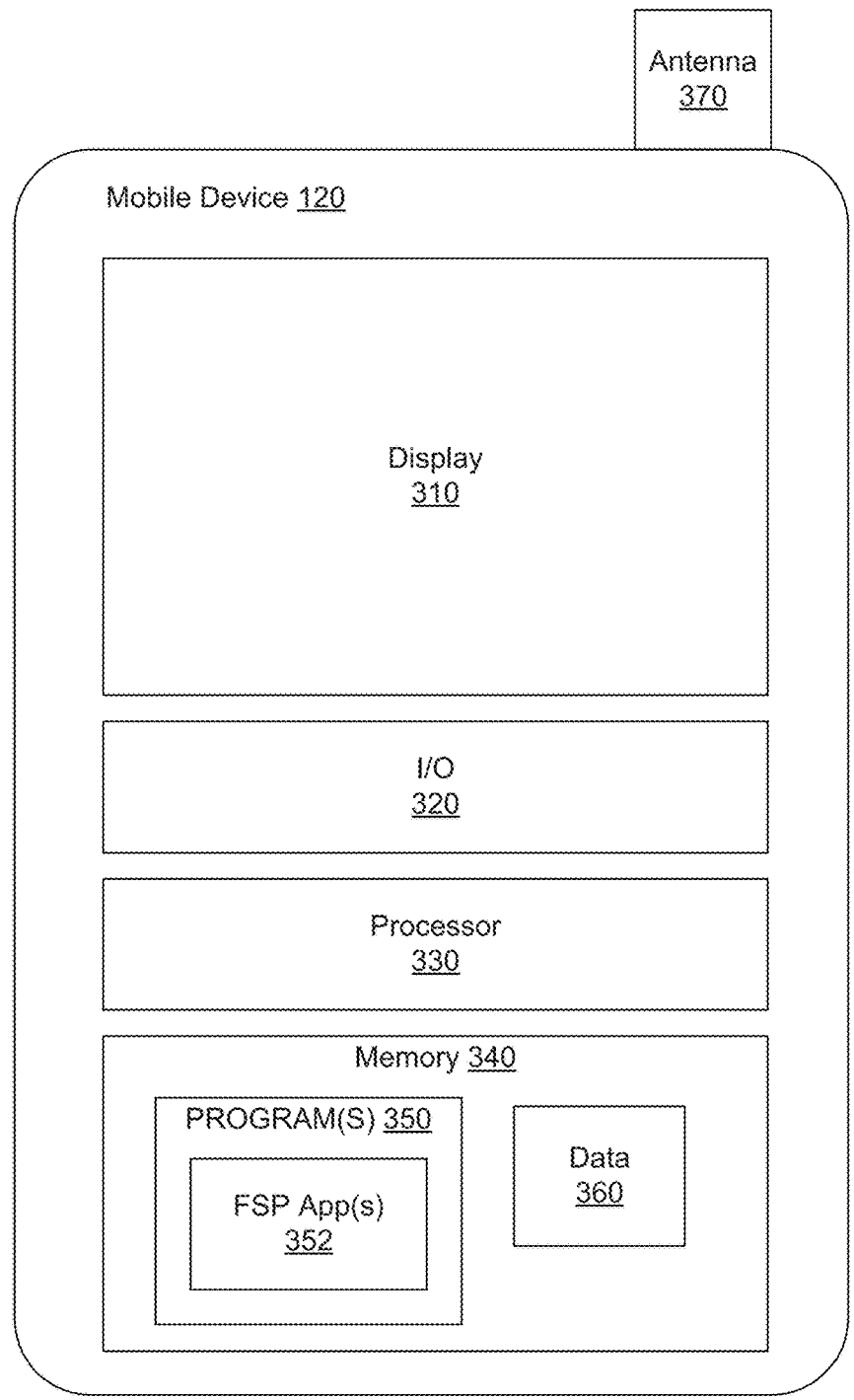
FIG. 3 is a diagram of an exemplary mobile device, consistent with disclosed embodiments.

FIG. 3 shows a diagram of an exemplary mobile device 120, consistent with disclosed embodiments. As shown, mobile device 120 may include display 310, I/O devices 320, processor 330, memory 340 having stored thereon data 360 and one or more programs 350, such as FSP app 352, and further including antenna 370.

Display 310 may include one or more devices for displaying information, including but not limited to, liquid crystal displays (LCD), light emitting diode (LED) screens, organic light emitting diode (OLED) screens, and other known display devices.

I/O devices 320 may include one or more devices that allow mobile device 120 to send and receive information. I/O devices 320 may include, for example, a keyboard, buttons, switches, and/or a touchscreen panel. I/O devices 320 may also include one or more communication modules (not shown) for sending and receiving information via antenna 370 from other components in system 100 by, for example, establishing wired or wireless connectivity between mobile device 120 to network 150, by establishing direct wired or wireless connections between mobile device 120 and FSP server 140, or between mobile device 120 and third party server 160. Direct connections may include, for example, Bluetooth™, Bluetooth LE™, WiFi, near field communications (NFC), or other known communication methods which provide a medium for transmitting data between separate devices.

Processor(s) 330 may be one or more known computing devices, such as those described with respect to processor 220 in FIG. 2.

Memory 340 may be a volatile or non-volatile, magnetic, semiconductor, tape, optical, removable, non-removable, or other type of storage device or tangible (i.e., non-transitory) computer-readable medium that stores one or more program(s) 350, such as FSP app 352, and data 360. Data 360 may include, for example, user 130's personal information, account information, and display settings and preferences.

Program(s) 350 may include operating systems (not shown) that perform known operating system functions when executed by one or more processors. By way of example, the operating systems may include Microsoft Windows™, Unix™, Linux™ Apple™ operating systems, Personal Digital Assistant (PDA) type operating systems, such as Microsoft CE™, or other types of operating systems. Accordingly, disclosed embodiments may operate and function with computer systems running any type of operating system. Mobile device 120 may also include communication software that, when executed by a processor, provides communications with network 150, such as Web browser software, tablet, or smart hand held device networking software, etc. Mobile device 120 may be a device that executes mobile applications for performing operations consistent with disclosed embodiments, such as a tablet or mobile device.

Program(s) 350 may also include FSP app(s) 352, such as an account information app, which when executed causes mobile device 120 to perform processes related to providing account status information. For example, FSP app(s) 352 may configure mobile device 120 to perform operations including: activating and setting up a new status display 110, receiving account information push updates from FSP server 140, sending account information requests to FSP server 140, receiving account information updates from FSP server 140, processing received account information, and providing detailed account status information to user 130 via display 310. In some embodiments, mobile device 120 may receive encrypted account information from FSP server 140, and decrypt the account information before displaying on display 310.

Figure 4:
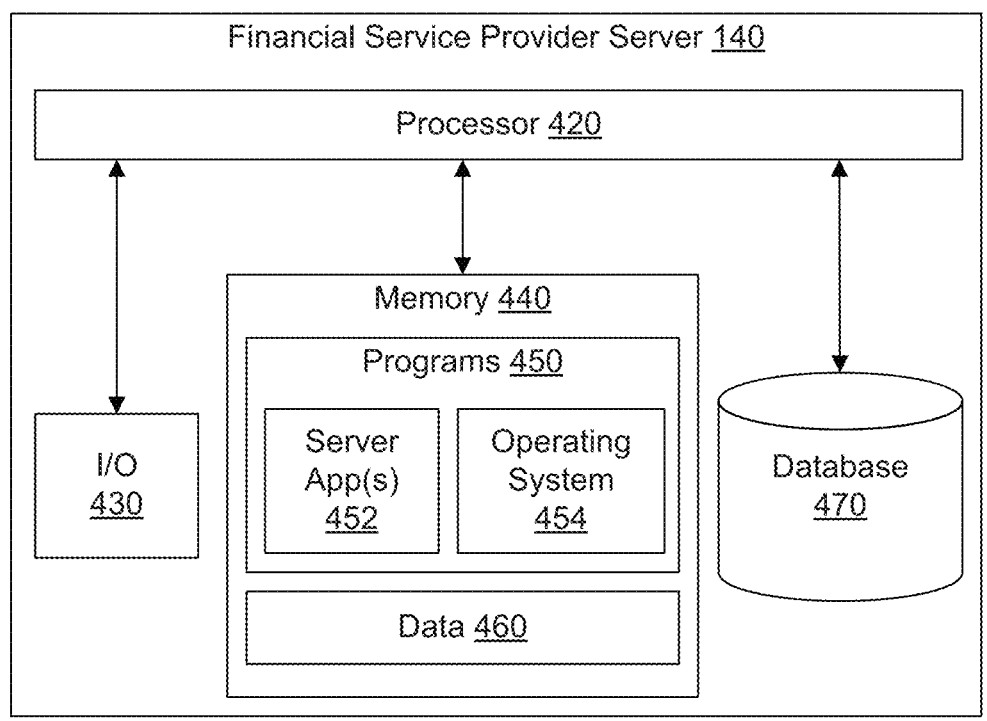
FIG. 4 is a diagram of an exemplary financial service provider server, consistent with disclosed embodiments.

FIG. 4 shows a diagram of an exemplary FSP server 140, consistent with disclosed embodiments. As shown, FSP server 140 may include one or more processor 420, input/output ("I/O") devices 430, memory 440 storing data 460 and programs 450 (including, for example, server app(s) 452 and operating system 454), and a database 470. FSP server 140 may be a single server or may be configured as a distributed computer system including multiple servers or computers that interoperate to perform one or more of the processes and functionalities associated with the disclosed embodiments.

Processor 420 may be one or more known processing devices, such as a microprocessor from the Pentium™ family manufactured by Intel™ or the Turion™ family manufactured by AMD™. Processor 420 may constitute a single core or multiple core processors that executes parallel processes simultaneously. For example, processor 420 may be a single core processor configured with virtual processing technologies. In certain embodiments, processor 420 may use logical processors to simultaneously execute and control multiple processes. Processor 420 may implement virtual machine technologies, or other known technologies to provide the ability to execute, control, run, manipulate, store, etc. multiple software processes, applications, programs, etc. In another embodiment, processor 420 may include a multiple-core processor arrangement (e.g., dual, quad core, etc.) configured to provide parallel processing functionalities to allow FSP server 140 to execute multiple processes simultaneously. One of ordinary skill in the art would understand that other types of processor arrangements could be implemented that provide for the capabilities disclosed herein.

FSP server 140 may also include one or more I/O devices 430 that may comprise one or more interfaces for receiving signals or input from devices and providing signals or output to one or more devices that allow data to be received and/or transmitted by FSP server 140. For example, FSP server 140 may include interface components, which may provide interfaces to one or more input devices, such as one or more keyboards, mouse devices, and the like, that enable FSP server 140 to receive input from an employee of the financial service provider (not shown).

FSP server 140 may include one or more storage devices configured to store information used by processor 420 (or other components) to perform certain functions related to the disclosed embodiments. In one example, FSP server 140 may include memory 440 that includes instructions to enable processor 420 to execute one or more applications, such as server applications, an electronic transaction application, an account status application, network communication processes, and any other type of application or software known to be available on computer systems. Alternatively or additionally, the instructions, application programs, etc. may be stored in an internal database 470 or external storage (not shown) in direct communication with FSP server 140, such as one or more database or memory accessible over network 150. Database 470 or other external storage may be a volatile or non-volatile, magnetic, semiconductor, tape, optical, removable, non-removable, or other type of storage device or tangible (i.e., non-transitory) computer-readable medium.

In one embodiment, FSP server 140 may include memory 440 that includes instructions that, when executed by processor 420, perform one or more processes consistent with the functionalities disclosed herein. Methods, systems, and articles of manufacture consistent with disclosed embodiments are not limited to separate programs or computers configured to perform dedicated tasks. For example, FSP server 140 may include memory 440 that may include one or more programs 450 to perform one or more functions of the disclosed embodiments. Moreover, processor 420 may execute one or more programs located remotely from account information display system 100. For example, FSP server 140 may access one or more remote programs, that, when executed, perform functions related to disclosed embodiments.

Programs 450 stored in memory 440 and executed by processor(s) 420 may include one or more server app(s) 452 and operating system 454. Server app(s) 452 may incorporate one or more financial services apps that cause processor(s) 420 to execute one or more processes related to financial services provided to customers including, but not limited to, processing credit and debit card transactions, checking transactions, fund deposits and withdrawals, transferring money between financial accounts, lending loans, processing payments for credit card and loan accounts, and retrieving account information, processing account information to determine an account status, comparing multiple account statuses to determine an account status to display, and generating account status information for the determined status to display.

Memory 440 and database 470 may include one or more memory devices that store data and instructions used to perform one or more features of the disclosed embodiments. Memory 440 and database 470 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

FSP server 140 may also be communicatively connected to one or more remote memory devices (e.g., remote databases (not shown)) through network 150 or a different network. The remote memory devices may be configured to store information and may be accessed and/or managed by FSP server 140. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Figure 5:
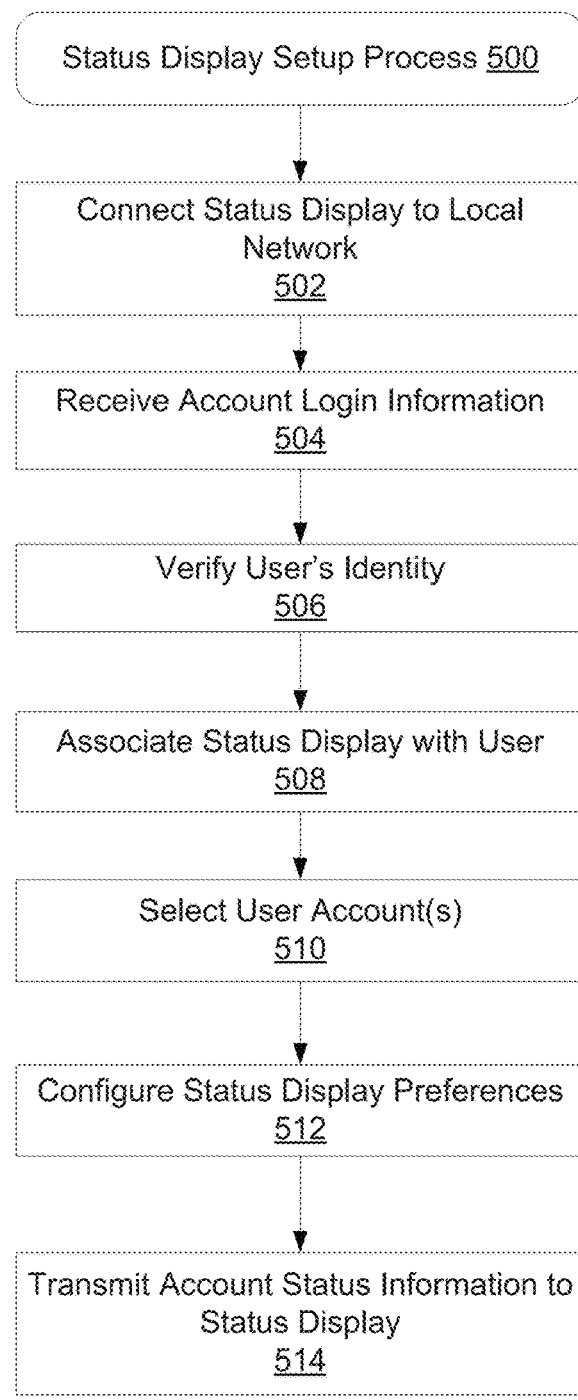
FIG. 5 is a flowchart of an exemplary process for status display setup, consistent with disclosed embodiments.

FIG. 5 shows a flowchart of an exemplary status display setup process 500. Process 500 is described as performed primarily by mobile device 120. In some embodiments, however, mobile device 120, FSP server 140, and/or status display 110 may perform one or more disclosed steps. Furthermore, process 500 is described as performed for user 130's account with FSP 140. In some embodiments, however, status display 110 may receive and display account information for an account held with a third party financial service provider, such as a bank that operates third party server 160, using the methods discussed herein. In some embodiments, FSP server 140 may receive account information for a plurality of accounts for user 130, including account information for accounts with the FSP and account information from one or more third party server(s) 160, process the received account information to determine statuses for the plurality of accounts, and/or determine one or more statuses to display on status display 110 based on the determined statuses and one or more rules.

Disclosed embodiments provide an easy to use interface for displaying a substantially continuous account status without the need for cumbersome authentication and login steps. To associate the correct account status information with the status display 110, status display 110 may be configured during the first use, such as by performing status display set up process 500. Setup process 500 may begin in step 502, where status display 110 connects to a network, such as local network 152. Status display 110 may include one or more buttons for activating transceiver 240 and connecting to local network 152. In some embodiments, status display 110 may pair with mobile device 120 via short range communication such as Bluetooth™, and mobile device 120 may be used to configure status display 110 including setting up preferences and connecting to local network 152. Those of ordinary skill in the art will realize that certain aspects of step 502 may be performed automatically by status display 110 and/or mobile device 120, and that certain aspects may require manual interaction by user 130. For example, in some embodiments, user 130 may be required to place one or more of status display 110 or mobile device 120 into a "pairing" mode. In some embodiments, status display 110 and/or mobile device 120 may initiate pairing mode automatically by wireless "handshake." Furthermore, certain aspects of connecting status display 110 to local network 152 may be automated by status display 110 and/or local network 152, and certain aspects may require manual interaction by user 130, such as an input of a network passcode.

In step 504, FSP server 140 may receive account login information from user 130, such as an account name or account number, and authentication information such as a password, personal identification (PIN) number, date of birth, social security number, and/or billing information. In some embodiments, FSP server 140 may receive account login information from user 130 via FSP app 352 on mobile device 120. In some embodiments, FSP app 352 may already have this information stored for user 130, and may re-request information for verifying user 130's identity, for the purpose of unlocking one or more accounts for association with status display 110.

In step 506, FSP server may receive account login information and verify user 130's identity. Upon receiving the login and authentication information, FSP server 140 may compare the information to one or more records stored in database 470 to determine whether user 130 is a current FSP customer and/or whether user 130's identify is verified.

In some embodiments, FSP app 352 may also send collected login and authentication information to a third party server 160 operated by another financial service provider, to verify user 130's identity and allow FSP server 140 and/or status display 110 to receive account information from one or more accounts held by separate financial service providers. Third party server 160 may authenticate user 130, and grant FSP server 140 access to user 130's account information held in third party server 160. Thereafter, FSP server 140 may request, access, and/or receive account information for one or more of user 130's accounts held by an institution other than FSP.

In step 508, FSP server 140 may associate status device 110 with user 130. In some embodiments, FSP server 140 may store a network address such as an IP address, or an identification number for status display 110 with information for user 130. Once associated, FSP server 140 may automatically send future account status information to the correct status display 110 without additional login steps or need for subsequent user 130 authentication.

Figure 6:
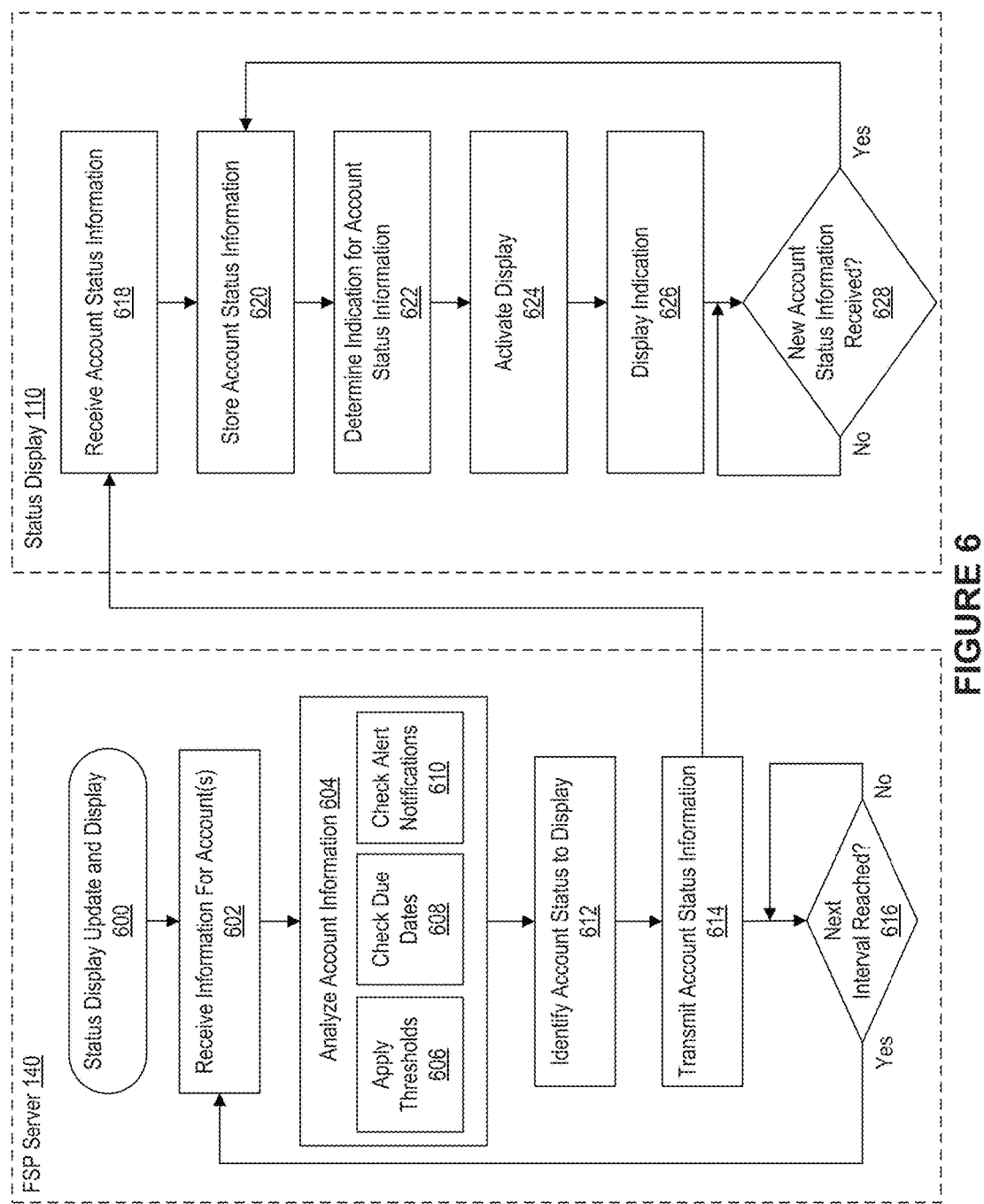
FIG. 6 is a flowchart of an exemplary status display update and display process, consistent with disclosed embodiments.

In step 510, FSP server 140 may receive a selection of accounts associated with user 130 to include in status update and display process 600 (shown in FIG. 6). In some embodiments, FSP server 140 may automatically select all accounts held by FSP and associated with user 130, and in other embodiments FSP server 140 may require manual selection of accounts. In some embodiments, the selection of accounts may include one or more accounts held by one or more third party servers 160. FSP server 140 may send requests to third party servers 160 to access account information and/or receive push updates from third party servers 160.

In step 512, in some embodiments, FSP server 140 may receive one or more preferences from user 130, to configure status display preferences. In some embodiments, FSP server 140 may receive one or more preferences from, for example, a settings file stored locally in memory 340 of mobile device 120, in memory 440 or database 470 of FSP server 140, or accessed remotely via network 150. In some embodiments, mobile device 120 may receive preferences via input from user 130 using I/O devices 320. Preferences may include, for example, a ranking of priority of a plurality of selected accounts (if multiple accounts became selected in step 510), one or more thresholds or rules to apply to account information such as spending goals, spending limits, account balance thresholds, and other account information to include or exclude from status indication such as payment due dates, fraud alerts, overdraft alerts, or any potential account issues identified by FSP server 140 or requested by user 130. FSP server 140 may store the received preferences as rules to apply in process 600 (described later with respect to FIG. 6).

In some embodiments, FSP server 140 may configure status display 110 preferences by identifying one or more actions associated with the received preferences. For example, FSP server 140 may identify fraud alerts and overdraft alerts as requiring immediate action, and configure FSP server 140 to send push updates to status display 110 immediately upon detecting fraudulent activity or an account overdraft on one or more of user 130's accounts. In some embodiments, FSP server 140 may receive user-defined amounts for spending limits and spending goals, to apply as rules for generating certain status indications. The number and type of preferences may vary depending on the needs of user 130, the needs of the financial service provider, and/or the functions and capabilities of FSP server 140 and status display 110.

In step 514, FSP server 140 may complete process 500 by transmitting the first account status information to status display 110. FSP server 140 may generate and transmit account status information by performing process 600, described with respect to FIG. 6.

FIG. 6 shows a diagram of an exemplary status display 110 update and display process 600, consistent with disclosed embodiments. In some embodiments, process 600 may include analyzing account information for one or more accounts associated with user 130, such as account information identified in step 510 of process 500, which may be accessed at FSP server 140 and/or received from third party servers 160.

Process 600 begins in step 602 when FSP server 140 receives information for the one or more accounts selected in process 500. In some embodiments, FSP server 140 may access account information stored in memory 440 or database 470, or access account information from a remote location. FSP server 140 may also request and receive information for one or more accounts from third party servers 160, or receive one or more push updates from third party servers 160. Account information may include any data relevant to a status of an account including, for example, an account balance, remaining balance/credit, individual transaction amounts, payment due dates, overdraft notifications, and/or fraud notifications. FSP server 140 may receive account information at predetermined intervals, such as every 15 minutes, every hour, every day, etc. At each interval, FSP server 140 may generate a request for updated account information. In some embodiments, FSP server 140 may receive push updates from a database or server having stored thereon updated account information. In some embodiments, FSP server 140 may receive push updates outside of the normal intervals in urgent situations, such as when fraudulent activity is detected.

In step 604, FSP server 140 processor 420 may analyze the received account information. Analysis may include applying predefined rules, as well as preferences configured in step 510, to the account information for each selected account, and determining a status for each account. In some embodiments, step 604 may include substeps 606, 608, and/or 610. Notably, processor 420 may determine multiple statuses for each account, depending on the number of thresholds, rules, and types of information analyzed for each account, which collectively or individually may be referred to as "status indicators."

In substep 606, processor 420 may apply one or more thresholds to account information for each selected account. Thresholds may include predefined thresholds such as, for example, a credit limit for the account set by the FSP. Thresholds may also include one or more user-defined thresholds configured in step 510 such as, for example, a personal spending limit, spending goal, or minimum desired account balance.

In substep 608, processor 420 may check any due dates or deadlines noted in received account information. In some embodiments, processor 420 may determine that a payment is due on an upcoming date, or that a promotional offer will expire on an upcoming date.

In substep 610, processor 420 may check alert notifications in the received account information. For example, in some embodiments, processor 420 may determine whether any fraud activity alerts are included in account information, as well as notifications from FSP regarding account information, account activity, warnings, or other informational notices warranting user 130's attention.

Based on the results from substeps 606, 608, and 610, FSP server 140 may compile one or more statuses for each account (not shown in figures). Each status may have an assigned priority level or importance level determined, for example, based on predefined rules employed by FSP server 140. For example, a status indicative of alert may have a high priority level and merit immediate user 130 attention, whereas a payment due in 10 days may have a low-mid priority level. FSP server 140 may correlate different statuses to numeric priority levels, to rank/prioritize the statuses for each account (not shown in figures).

In step 612, FSP server 140 may identify an account status to display on status display 110. In some embodiments, FSP server 140 may identify the status determined most urgent and/or time sensitive with respect to receiving attention from user 130. For example, the identified status may be the status having the highest rank/priority level based on importance and urgency.

In some embodiments, status display 110 may include a simple display 210, such as a single indicator light, and therefore may display only a single status at a time. In such embodiments, FSP server 140 may determine the highest priority status among all statuses for all accounts, to display the "worst case scenario" of all accounts. For example, if five accounts are linked to status display 110, FSP server 140 may determine which status of the five accounts requires the most attention. For instance, if four of the five accounts have no alerts or notifications, and are considered to be "normal," and the fifth account has a single notification pending, FSP server 140 may identify the "notification" status as the selected status for displaying on status display 110. In another instance, if three of the five accounts have "notification" statuses, one account has a "normal" status, and the fifth account has an "alert" status, then FSP server 140 may select the "alert" status for displaying on status display, as the "alert" status is most urgent and requires more immediate attention. As discussed in more detail later, FSP app 352 on mobile device 120 may provide user 130 with all account statuses and detailed information upon logging in. For example, user 130 may notice the "alert" status indicated on status display 110 and access FSP app 352 on mobile device 120 for the additional details.

In other embodiments, status display 110 may include multiple displays 210, enabling the display of multiple statuses simultaneously. Depending on the capabilities of status display 110, FSP server 140 may identify one or more statuses for generating account status information. In embodiments where status display 110 is capable of indicating multiple account statuses, FSP server 140 may select a quantity of the highest-ranked/prioritized statuses equal to the number of statuses that status display 110 can simultaneously provide.

FSP server 140 may also generate account status information for the identified account status (step not shown) for instructing status device 110 regarding what indication to display. In some embodiments, FSP server 140 may generate a simple alphanumeric code based on the identified account status and/or the status urgency or priority. By generating the account status information at FSP server 140, status display 110 does not need to receive detailed account information and analyze the information. Therefore, the present embodiments reduce the amount of processing power in status display 110, thereby also reducing power requirements.

In step 614, FSP server 140 may transmit the generated account status information to status display 110 via network 150 and local network 152.

In step 616, FSP server 140 may determine whether the next time interval is reached, and if not ("no" in step 616), then in step 616 loops until the next interval is reached. If the next time interval is reached ("yes" in step 616), then process 600 returns to step 602, to receive updated account information, and repeat steps 604-614 with the updated account information. In some embodiments, if a push update is received with account information corresponding to an urgent status, process 600 may return to step 602 before a next interval is reached, and repeat steps 604-614 with the push update account information.

Referring to status display 110 in FIG. 6, in step 618 status display 110 may receive updated account status information from FSP server 140, via local network 152. In some embodiments, status display 110 may communicate directly with FSP server 140 and/or third party server 160 to receive account status information.

In step 620, status display 110 may store received account status information in memory 250. In some embodiments, processor 220 may overwrite old data stored in memory 250 when updated account status information is received and memory 250 is full.

In step 622, processor 220 may determine an indication corresponding to the account status information. Memory 250 may store instructions for a plurality of indications including instructions for illuminating different colored lights, instructions for displaying graphics, instructions for generating one or more sounds, and/or instructions for interfacing with one or more external devices via application programming interfaces (APIs, discussed in further detail later). Memory 250 may also store a plurality of relationships associating the stored indications with different types of account status information. For example, memory 250 may store associations between the alphanumeric codes received in the account status information to one or more stored indications. The stored relationships and indications may be preprogrammed and/or generated based on data identified in step 510 of process 500.

Processor 220 may determine, based on the stored relationships, which indication should be displayed for the received account status information. For example, if the account status information includes a "normal" account status for all accounts, a first stored relationship may associate a "normal" status with a steady green light indication. As another example, if the account status information includes an "alert" status for at least one account, a second stored relationship may associate an "alert" status with a red flashing light indication and/or an audible tone. As yet another example, if the account status information includes an intermediate status between "normal" and "alert," such as a status indicating that a payment is coming due, a third stored relationship may associate the intermediate status with a pulsating yellow light indication. In some embodiments, FSP server 140 may select a single status to include in the account status information, relieving status display 110 of the task of selecting one from a plurality of statuses to display.

In some embodiments, associated indications may include graphics, such as a check mark representing a "normal" status and an exclamation point representing an "alert" or "urgent" status. In other embodiments, associated indications may include one or more avatars, and memory 250 may store instructions for generating different expressions on the avatar corresponding to "normal," "notification/warning," and "alert/urgent" statuses.

In some embodiments, memory 250 may also store instructions for causing display 210 to produce different illumination patterns such as a steady illumination, a rapid flashing pattern, a variable flashing pattern such as a "staccato" pattern, and a gently pulsing pattern. Processor 220 may select an illumination pattern corresponding to the urgency of the status. In some embodiments, processor 220 may select a steady or gently pulsing pattern to use with a green light to indicate a "normal" status, select a gently pulsing or staccato pattern to use with a yellow light for a warning/notification status, and select a rapid flashing to use with a red light to indicate an "alert" or "urgent" status. Relationships between illumination patterns and urgency may be preprogrammed and stored in memory 250, and/or may be configured by user 130 during process 500.

In step 624, processor 220 may activate display 210 to display the determined indication. In some embodiments, display 210 may remain constantly activated, providing a constant ambient light or graphic indication that user 130 may observe simply by glancing at status display 110. In other embodiments, processor 220 may receive data from one or more sensors 260, and automatically activate display 210 when a predetermined condition is satisfied, such as when movement or sound is detected proximate to status display 110. In other embodiments, processor 220 may activate display 210 upon receiving input from user 130 via I/O devices 230, such as when user 130 presses a button on status display 110.

After activation, display 210 may display the determined indication in step 626. In embodiments that are not continuously active, step 626 may last for a predetermined amount of time, after which processor 220 deactivates display 210 until another activation is detected (steps not shown). In other embodiments, processor 220 may deactivate display 210 based on input received from user 130 via I/O devices 230.

In some embodiments, I/O devices 230 may include a button for temporarily disabling display 210, in order to suppress or "snooze" the displayed indication for a predetermined period of time. Some embodiments of status display 110 may include a speaker to provide an audible indication in addition to or instead of display 210, and I/O devices 230 may include a button to temporarily mute the audible indication.

In step 628, processor 220 may determine whether new account status information is received from FSP server 140, such as updated account status information for the next time interval, or a push update with an urgent/alert status. If new account status information is received ("yes" in step 628), then process 600 may return to step 620, to store the new account status information and repeat steps 622-626. If new account status information is not received ("no" in step 628), then step 628 may continue looping until new account status information is received.

In some embodiments, FSP app 352 on mobile device 120 may provide additional account status information to user 130. For example, upon noticing a yellow (e.g. "warning/notification") or red (e.g. "alert/urgent") indication, user 130 may wish to know the reasons causing the warning or alert. User 130 may launch FSP app 352 on mobile device 120, and mobile device 120 may receive credentials (via, e.g., I/O 320) to use in verifying user 130's identity (steps not shown). After FSP app 352 and/or FSP server 140 verifies user 130's identity, FSP app 352 may provide user 130 with the same indication displayed on status display 110 along with detailed information explaining what caused the status indication. For example, FSP app 352 may display a flashing red light that matches the flashing red light on status display 110, inform user 130 about fraudulent activity detected in their account, and further prompt user 130 to contact the FSP. In some embodiments where status display 110 is linked to multiple accounts, FSP app 352 may display individual indicators and detailed status information for each account. By providing a simple and constant status indication on status display 110, user 130 remains informed of their general financial status without expending significant power or processing power, and without creating security risks associated with transmitting sensitive information. Furthermore, by providing detailed account status information upon request in FSP app 352, user 130 can retrieve detailed sensitive account information once they know their attention is needed.

Figure 7A:
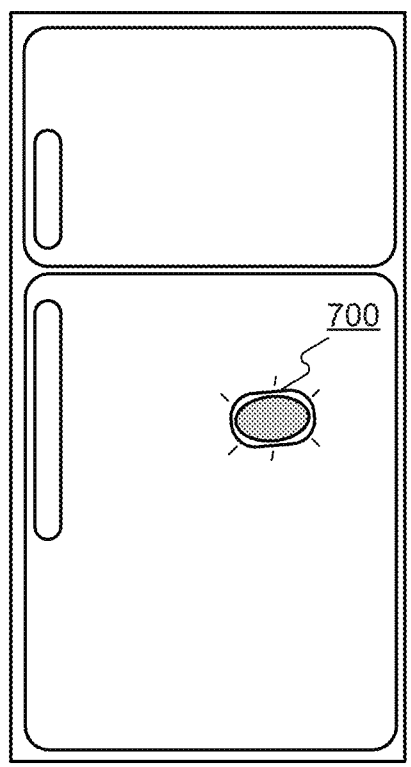
FIGS. 7A-7C are illustrations of exemplary status displays, consistent with disclosed embodiments.

As discussed earlier, in some embodiments, status display 110 is a small standalone device such as a magnetic button removably affixed to a home appliance such as a refrigerator. FIG. 7A shows an illustration of status display 110 formed as a button magnet 700 and affixed to a refrigerator. Button magnet 700 may include a single indicator light as shown, or may include a plurality of lights or a graphic display for providing an indication of account status.

Figure 7B:
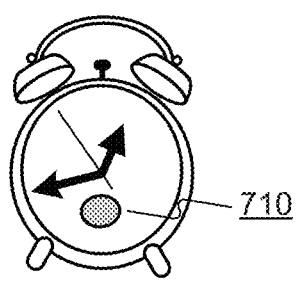

In some embodiments, status display 110 may be a module built into the housing of another household or office item, such as an alarm clock or a mirror. FIG. 7B shows an illustration of status display 110 formed as a module built into an alarm clock. As shown in FIG. 7B, the components of status display 110 are integrated within the housing of the alarm clock, with a display such as indicator light 710 located in the clock face.

Figure 7C:
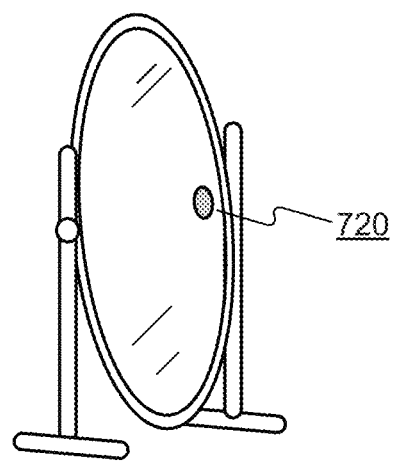

FIG. 7C shows an illustration of status display 110 formed as a module built into a mirror. As shown in FIG. 7C, the components of status display 110 are integrated within the housing of the mirror, with a display such as indicator light 720 located in the mirror glass.

FIGS. 7A-7C are not meant to limit embodiments of the present disclosure in any way, and those of ordinary skill in the art will realize that status display 110 may be built into other types of devices such as, for example, a light fixture, a television, stereo system, etc. In some embodiments, status display 110 may be configured to interact with other electronic devices and appliances in the home using APIs, such as a programmable home lighting system or programmable thermostat. For example, status display 110 may instruct a home lighting system to illuminate one or more lights in a certain color and/or in a certain pattern based on account status information, similar to the functionality of display 210 on status display 110. In some embodiments, status display 110 may be configured to control one or more appliances, such as by turning off a programmable thermostat when account status information indicates an overdraft or insufficient funds in user 130's account, to reduce costly heating and cooling bills. Various functionalities may be achieved using application program interfaces (APIs) between status display 110 and communicating household appliances, and the functions may be preprogrammed or setup and configured by user 130 during process 500.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware, firmware, and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A display device for providing an account status, comprising:
    a processor;
    a display;
    a transceiver;
    at least one sensor; and
    a memory having stored thereon instructions that, when executed by the processor, configure the processor to:
        establish a connection with a communication network via the transceiver to access account status information for a first account and a second account associated with a user;
        receive the account status information for the first account and second account via the connection;
        analyze the received account status information for the first account and second account to identify one or more status indicators pertaining to the first account and one or more status indicators pertaining to the second account;
        determine a first status indication for the first account based on a status indicator with the highest priority among the one or more status indicators pertaining to the first account, and a second status indication for the second account based on a status indicator with the highest priority among the one or more status indicators pertaining to the second account;
        output, via the display, the determined first status indication and second status indication,
            wherein each status indication comprises the most urgent or time sensitive scenario for each account;
        collect data from the least one sensor, and
        modify the outputted first status indication and second status indication based on the collected data.

2. The display device of claim 1, wherein the received account status information for the first account and second account excludes sensitive information identifying the user, the first account, or the second account.

3. The display device of claim 1, wherein the display comprises a multicolored light, and each of the determined first status indication and second status indication comprises an illuminated color.

4. The display device of claim 1, wherein the display comprises a display screen, and each of the determined first status indication and second status indication comprises an image.

5. The device of claim 1, wherein the at least one sensor includes a microphone.

6. The device of claim 1, wherein the at least one sensor includes an ambient light sensor.

7. A system for providing an account status, comprising:
    a transceiver;
    at least one sensor;
    a memory; and
    a processor coupled to the transceiver and configured to execute instructions stored in the memory to:
        receive information for a first account and a second account associated with a user;
        analyze the received information to identify one or more status indicators pertaining to the first account and one or more status indicators pertaining to the second account;
        determine a first status for the first account based on a status indicator with the highest priority among the one or more status indicators pertaining to the first account and a second status for the second account based on a status indicator with the highest priority among the one or more status indicators pertaining to the second account;
        generate account status information based on the determined first status and second status, the account status information excluding sensitive information that identifies the user the first account or the second account;
        transmit, by the transceiver, the generated account status information to a display device for output;
            wherein the generated account status information comprises the most urgent or time sensitive scenario for each account;
        collect data from the at least one sensor; and
        transmit the collected data to the display device to cause the display device to modify an output.

8. The system of claim 7, wherein the processor identifies the one or more status indicators for the first account or the second account by at least one of comparing the received information for the first account or the second account to one or more thresholds or determining whether the received information for the first account or the second account contains any messages or alerts.

9. The system of claim 7, wherein the at least one sensor includes a microphone.

10. The system of claim 7, wherein the at least one sensor includes an ambient light sensor.

11. A computer-implemented method of providing an account status, the method comprising:
    accessing information from a database for a first account and a second account associated with a user;
    analyzing, by a processor, the received information to identify one or more status indicators pertaining to the first account and one or more status indicators pertaining to the second account;
    determining a first status for the first account based on a status indicator with the highest priority among the one or more status indicators pertaining to the first account, and a second status for the second account based on a status indicator with the highest priority among the one or more status indicators pertaining to the second account;
    generating, by the processor, account status information based on the determined first status and second status, the account status information excluding sensitive information that identifies the user, the first account, or the second account;
    transmitting, by a transceiver, the generated account status information to a display device for output;

wherein the generated account status information comprises the most urgent or time sensitive scenario for each account;
collecting data from at least one sensor; and
transmitting the collected data to the display device to cause the display device to modify an output.

12. The method of claim 11, wherein identifying the one or more status indicators for the first account or the second account comprises at least one of comparing the received information for the first account or the second account to one or more thresholds or determining whether the information for the first account or the second account contains any messages or alerts.

13. The method of claim 11,
wherein the at least one sensor includes at least one of a microphone or an ambient light sensor.

* * * * *